(12) United States Patent
Feng

(10) Patent No.: US 9,455,860 B2
(45) Date of Patent: Sep. 27, 2016

(54) METHOD AND APPARATUS FOR CREST FACTOR REDUCTION

(71) Applicant: Telefonaktiebolaget L M Ericsson (publ), Stockholm (SE)

(72) Inventor: Guizhu Feng, Sichuan (CN)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/648,212

(22) PCT Filed: Dec. 4, 2012

(86) PCT No.: PCT/CN2012/085820
§ 371 (c)(1),
(2) Date: May 28, 2015

(87) PCT Pub. No.: WO2014/085976
PCT Pub. Date: Jun. 12, 2014

(65) Prior Publication Data
US 2015/0349994 A1     Dec. 3, 2015

(51) Int. Cl.
*H04L 27/26* (2006.01)
*H04L 1/20* (2006.01)

(52) U.S. Cl.
CPC ............. *H04L 27/2623* (2013.01); *H04L 1/20* (2013.01)

(58) Field of Classification Search
USPC .......................... 375/260, 296, 224, 297, 346
See application file for complete search history.

(56) References Cited

U.S. PATENT DOCUMENTS 8,649,471 B1 * 2/2014 Charbonneau ...... H04L 27/2624
                                                                341/132

(Continued)

FOREIGN PATENT DOCUMENTS

CN    101488776 A    7/2009
CN    102065529 A    5/2011

(Continued)

OTHER PUBLICATIONS

International Preliminary Report on Patentability for Application No. PCT/CN2012/085820, mailed Jun. 18, 2015, 7 pages.

(Continued)

*Primary Examiner* — Eva Puente
(74) *Attorney, Agent, or Firm* — Nicholson De Vos Webster & Elliott LLP

(57) ABSTRACT

The invention provides apparatuses and method for crest factor reduction. In one embodiment, an apparatus comprising: a plurality of peak detectors respectively corresponding to a plurality of paths, each peak detector detecting a peak from an input signal; a statistical multiplexer, statistically multiplexing the peaks from the plurality of peak detectors; an allocator, allocating one of the multiplexed peaks to one of a plurality of peak cancellation units; the plurality of peak cancellation units, each generating, for an allocated peak, a cancellation peak; a plurality of de-multiplexers respectively corresponding to the plurality of peak cancellation units, each de-multiplexing the cancellation peak onto a corresponding path; a plurality of summation units respectively corresponding to the plurality of paths, each summing the de-multiplexed cancellation peaks on one path; and a plurality of subtraction units, each subtracting the summed cancellation peaks from the input signal on the path to obtain a peak-cancelled signal.

18 Claims, 8 Drawing Sheets

(56) References Cited

U.S. PATENT DOCUMENTS

| | | | |
|---|---|---|---|
| 8,897,388 B2* | 11/2014 | Molina | H04L 1/0054 |
| | | | 375/295 |
| 9,160,594 B1* | 10/2015 | Copeland | H04B 1/0475 |
| 2012/0093210 A1* | 4/2012 | Schmidt | H04L 27/2624 |
| | | | 375/224 |
| 2012/0163311 A1 | 6/2012 | Park | |
| 2012/0281679 A1 | 11/2012 | Fan et al. | |
| 2014/0044215 A1* | 2/2014 | Mundarath | H04L 27/2624 |
| | | | 375/297 |
| 2014/0169496 A1* | 6/2014 | Yang | H04L 27/2626 |
| | | | 375/296 |

FOREIGN PATENT DOCUMENTS

| | | |
|---|---|---|
| CN | 102299883 A | 12/2011 |
| JP | 2006-523404 A | 10/2006 |
| JP | 2012-119827 A | 6/2012 |

OTHER PUBLICATIONS

International Search Report and Written Opinion for International Application No. PCT/CN2012/085820, mailed Sep. 19, 2013, 11 pages.

Li et al., "Effects of Clipping and Filtering on the Performance of OFDM," IEEE, 1997, pp. 1634-1638.

Hemphill et al., "Peak Cancellation Crest Factor Reduction Reference Design," Virtex-5 and Virtex-4 Family, XAPP1033 (v1.0), Nov. 18, 2007, pp. 1-31.

Wang et al., "Wideband wireless communication OFDM technology," China Posts and Telecom Press, 2007, pp. 93-110.

Notice of Ground for Rejection for Japan Application No. 2015-547889, mailed May 9, 2016, 5 pages.

Supplementary European Search Report and Written Opinion for Application No. EP 12889504.2, mailed Jun. 7, 2016, 6 pages.

DVB Organization: "rct031.PDF", DVB, Digital Video Broadcasting, Oct. 3, 2003, pp. 1-20.

* cited by examiner

NS-CFR Algorithm 100a

PC-CFR Algorithm 100b

METHOD AND APPARATUS FOR CREST FACTOR REDUCTION

CROSS-REFERENCE TO RELATED APPLICATIONS

This application is a National stage of International Application No. PCT/CN2012/085820, filed Dec. 4, 2012, which is hereby incorporated by reference.

BACKGROUND OF THE INVENTION

1. Field of Invention

The present invention relates to a crest factor reduction technique in a communication field, and particularly to a method and an apparatus for peak cancellation crest factor reduction in a Radio Remote Unit (RRU) in a wireless communication system.

2. Description of Prior Art

Peak-to-average power ratio (PAPR) is one of the most critical problems of Orthogonal Frequency Division Modulation (OFDM). Generated by summation of a large number of subcarriers, an OFDM signal usually has a high PAPR. In a radio front end, high PAPR may lead to serious back-off of power amplifiers (PAs), and result in a low efficiency of the PA.

To reduce the PAPR of OFDM, a series of Crest Factor Reduction (CFR) techniques have been introduced in reference document [1] (W. B. Wang, K. Zheng, "Wideband wireless communication OFDM technology", pp. 93-110, China Posts and Telecom Press, 2007). In baseband processing, most PAPR reduction methods are based on redundancy employing such as coding, selective mapping and tone reservation. These techniques cause no signal distortion, but severe computation complexity and lower spectrum efficiency. Furthermore, for multicarrier application, baseband processing schemes can hardly predict the PAPR after interpolation and carrier combination. Therefore, it is better to reduce PAPR in a digital Intermediate Frequency (IF) domain after carrier combination. And the most efficient way to reduce PAPR in the digital IF is clipping.

Clipping is a non-linear process that may cause severe in-band distortion and out-band noise. In-band distortion leads to Error Vector Magnitude (EVM), Signal-to-Noise Ratio (SNR) and Block Error Rate (BLER) degradation, while out-band noise may cause Adjacent Channel Leakage Ratio (ACLR) failure. Therefore, it is important to design the clipping algorithm deliberately to reduce PAPR with limited EVM and ACLR degradation.

Noise Shaping Crest Factor Reduction (NS-CFR) and Peak Cancellation Crest Factor Reduction (PC-CFR) are two of the most popular clipping algorithms. As shown in FIG. 1 (a), a NS-CFR algorithm 100a may extract an input signal above of a predetermined clipping threshold in a peak extraction block 110a, and reshape it by a filtering block 130a. Then the input signal delayed by a matched delay block 150a may be subtracted by this shaped peak signal.

A PC-CFR algorithm may generate a pre-shaped peak signal when a peak is detected. Then this pre-shaped peak may be scaled and subtracted from the input signal. As seen from FIG. 1(b), which shows a typical structure of the PC-CFR algorithm 100b, when a peak is detected by the peak detection block 110b, the PC-CFR algorithm 100b allocates the peak to one of the cancellation units inside the peak cancellation block 130b, so as to generate the pre-shaped and scaled cancellation peak to be subtracted from the input signal delayed by the match delay block 150b.

Generally, peaks of a Long-Term Evolution (LTE) signal arrive in low probabilities. This indicates a significant characteristic of signal peaks—sparsity. The PC-CFR algorithm may exploit the sparsity of signal peaks. A small number of peak cancellation units may be enough to do the clipping task, therefore hardware resource may be greatly reduced. As for clipping performance, in general, the NS-CFR algorithm has a comparable performance with the PC-CFR algorithm, because the intrinsic principles of these algorithms are similar. But specifically, the PC-CFR algorithm works a little better than the NS-CFR algorithm in metric of PAPR and EVM, as shown in reference document [2] (E. Hemphill, S. Summerfield, G. Wang, and D. Hawke, "Peak Cancellation Crest Factor Reduction Reference Design", XAPP1033 (V1.0), Xilinx, Nov. 18, 2007). In reference document [3] (W. B. Wang, K. Zheng, "Wideband wireless communication OFDM technology", pp. 93, China Posts and Telecom Press, 2007), simulations also show that the PC-CFR algorithm is better measured by PAPR reduction and SNR drop.

Hereinafter, a detailed block diagram of a PC-CFR unit using the PC-CFR algorithm in the prior art may be described with reference to FIG. 2.

FIG. 2 illustratively shows a detailed block diagram of a PC-CFR unit 200. As shown in FIG. 2, the PC-CFR unit 200 may comprise a peak detector 210 including a peak extractor 211 and a peak indication unit 213, an allocator 220, a plurality of peak cancellation units 230s (here are four peak cancellation units 230s as an example), a summation unit 240, a matched delay unit 250, and a subtraction unit 260.

The peak detector 210 may detect a peak from an input signal. Generally, the detection of the peak may be carried out on magnitude of the input signal.

In particular, the peak extractor 211 may calculate the magnitude and a phase of the input signal using e.g. Coordinate Rotational Digital Computer (CORDIC) algorithm. Then, the peak extractor 211 may subtract the magnitude of the input signal by a predetermined clipping threshold to obtain a magnitude difference $D_{Mag}$ between the magnitude and the threshold. The threshold may be determined based on PARP requirement and an average power of the input signal.

The peak indication unit 213 may indicate a maximum value of the $D_{Mag}$s as a peak indicator for a peak. The maximum value may be obtained by comparison with neighboring values. It can either be a local max value or a global max value in a given time window, as will be understood by the skilled in the art.

Once an incoming peak is detected, the allocator 220 may allocate the peak to one of the peak cancellation units 230s for generating a cancellation peak. As well-known by the skilled in the art, the "peak" here is actually represented by peak information on the detected peak of the input signal, which includes the magnitude difference $D_{Mag}$ and the phase of the detected peak. The term "peak" is used here and hereinafter for simplicity.

In this example, it is assumed that there are four peak cancellation units 230s. Each peak cancellation unit 230 may cancel only one peak at a time. The length of the cancellation peak together with the number of the peak cancellation units 230s may determine a rate at which the peaks may be cancelled. When a new peak is detected, the allocator 220 may assign an available peak cancellation unit 230 to cancel that peak. If all the peak cancellation units 230s are unavailable when a new peak is detected, the peak will not be cancelled. Multiple iterations of PC-CFR may be necessary to eliminate the peaks that were not cancelled during an earlier PC-CFR process.

The magnitude of the cancellation peak may be scaled to the magnitude difference $D_{Mag}$ between the corresponding peak magnitude and the clipping threshold. The cancellation peak may be designed to have a spectrum that matches that of the input signal and therefore may only introduce negligible out-of-band interference. The cancellation peak may be stored as cancellation peak coefficients in a RAM in advance. Generally, the peak cancellation unit 230 may include two blocks of RAM for storing the input signal (one for storing I coefficients and one for storing Q coefficients) and one complex multiplier which may include four DSP multipliers for scaling. As will be understood by the skilled in the art, the cancellation peak coefficients may be predetermined by carrier configuration including carrier number, carrier frequency and carrier bandwidth etc. For example, in the application of a single carrier with a central frequency of 0, the spectrum shape is rectangular, which corresponds to a set of coefficients like a sinc waveform in the time domain.

Once the incoming peak is allocated to one of the peak cancellation units 230s, these coefficients will be read out sequentially. Then the cancellation peak coefficients may be scaled by the magnitude difference $D_{Mag}$ and the phase of the incoming peak in the peak cancellation unit 230. Although there are four peak cancellation units 230s in this example, the number of the peak cancellation units may be varied depending on actual design demands in consideration of e.g. the carrier number, the carrier bandwidth, and statistic characteristics of the carrier data.

Then, outputs of all the cancellation units 230s may be summed in the summation unit 240. And the sum from the summation unit 240 may be subtracted from a delayed input signal output from the matched delay unit 250 by the subtraction unit 260.

Since the number of peak cancellation units is limited, it is always possible that when all peak cancellation units are occupied, it is unable to process new coming peaks. This will lead to peak leakage and bring a high risk to the PA. In order to mitigate the peak leakage problem and achieve better performance, iterative clipping may be used. For a single carrier LTE application with a bandwidth of 20 MHz, a simulation and on-board test shows that the PC-CFR with 2~4 stages of clipping is suitable.

Unfortunately, for various reasons, the current PC CFR algorithm may not be efficient any more for a multicarrier LTE application with carrier number no less than 2 and a signal bandwidth no less than 40 MHz.

Firstly, the PAPR of the input signal grows along with the increase of carrier number, since for the OFDM signal, PAPR≈N, N is the total sub-carrier number (reference document [4] X. Li, L. J. Cimini Jr, "Effects of Clipping and Filtering on the Performance of OFDM" in Proc. of Vehicular Technology Conference, IEEE, pp. 1634, 1997 Invention Information). FIG. 3 shows an example that the PAPR grows along with carrier number. This problem brings a serious challenge to the PC-CFR algorithm, since the arrival rate of peaks grows severely with the increase of PAPR, which may lead to a much larger number of peak cancellation units and clipping stages, also higher risk of peak leakage.

Secondly, the sample rate in the digital IF must be high enough for interpolation and carrier combination. Implementation of digital pre-distortion (DPD) also requires a high oversampling rate. These result in a sample rate higher than 200 MHz in the digital IF. For PC CFR, a higher sample rate will lead to a higher order of coefficients and more difficult for time division multiplexing. Furthermore, peak re-growth after filtering and interpolation will compromise the reduction of PAPR for wideband signal after clipping. These challenges cause poor clipping performance. Iterative clipping may mitigate the degraded performance problem, but results in exponentially increase of clipping stages. Fractional filter between clipping stages may mitigate the effect of peak re-growth, but also needs extra filters for each stage. Therefore, the hardware implementation will be far more complicated and power consumption will be much higher. As an example, according to an on-board test, for a 2×20 MHz LTE application scenario, with 11 dB PAPR at 0.01% probability, the PC CFR algorithm works at a sample rate of 122.88 MHz after carrier combination. If one clipping stage contains four peak cancellation units, it will need 5~6 stages of clipping at least to get PAPR≤8 dB and EVM≤5% for a transceiver (TRX) board output.

For all these reasons, previous PC-CFR algorithm can hardly work efficiently in the multicarrier LTE application. There is a desire of simplifying design, in order to address at least some of the serious challenges brought by the multicarrier LTE application.

SUMMARY OF THE INVENTION

Accordingly, a main object of the present invention is to provide a novel PC-CFR approach which employs statistical multiplexing. Since signal peaks always come by low probability (although higher in the multicarrier situation), randomicity is an inherent characteristic of peaks. Therefore, statistical multiplexing may use dynamic resource allocation technique to improve the efficiency of clipping.

According to one aspect of the present invention, an apparatus for crest factor reduction may be provided. The apparatus may comprise: a plurality of peak detectors respectively corresponding to a plurality of paths, each peak detector being configured for detecting a peak from an input signal on a corresponding path; a statistical multiplexer, configured for statistically multiplexing the peaks from the plurality of peak detectors; an allocator, configured for allocating one of the multiplexed peaks to one of a plurality of peak cancellation units; the plurality of peak cancellation units, each configured for generating, for the allocated peak, a cancellation peak; a plurality of de-multiplexers respectively corresponding to the plurality of peak cancellation units, each de-multiplexer being configured for de-multiplexing the cancellation peak onto the corresponding path; a plurality of summation units respectively corresponding to the plurality of paths, each configured for summing the de-multiplexed cancellation peaks on one path; and a plurality of subtraction units respectively corresponding to the plurality of paths, each configured for subtracting the summed cancellation peaks from the input signal on the same path to obtain a peak-cancelled signal.

Preferably, the apparatus may further comprise a plurality of matched delay units respectively corresponding to the plurality of paths, each configured for matched-delaying the input signal before being subtracted by the summed cancellation peaks on the same path.

According to this aspect of the present invention, the efficiency of the apparatus may be improved due to the statistical multiplexing of the plurality of input signals.

Preferably, the apparatus may further comprise an identifying unit connected to the plurality of peak detectors, configured for identifying which one of the plurality of paths the peak comes from, once the peak is detected.

Preferably, the de-multiplexer may be configured to de-multiplex the cancellation peak onto the corresponding path according to a corresponding identifier output from the identifying unit.

Preferably, the identifying unit is a priority encoder, so that one or more of the plurality of paths have a higher priority to be processed.

Alternatively, the input signal may be a time division multiplexed (TDM) signal and the peak-cancelled signal is a peak-cancelled TDM signal. Accordingly, the apparatus may further comprise: a plurality of time division multiplexing units respectively connected to the plurality of peak detectors, each configured for multiplexing, according to a fixed order of time taps, signals from a plurality of ways into the TDM signal; and a plurality of time division de-multiplexing units respectively connected to the plurality of subtraction units, each configured for de-multiplexing, according to the fixed order of the time taps, the peak-cancelled TDM signal output from the subtraction unit onto the plurality of ways.

Preferably, the plurality of ways are N ways and the plurality of paths are [N/M] paths, where M is a TDM factor which is defined as a ratio of a system clock frequency and a signal sample rate, N and M are integers, and "[ ]" represents a ceil operation.

Preferably, the peak cancellation unit may generate the cancellation peak by scaling a plurality of cancellation peak coefficients pre-stored in the peak cancellation unit which are read out once every M time taps with a phase and a magnitude difference between a magnitude and a predetermined threshold of the peak.

According to this aspect of the present invention, the apparatus may further improve M times of the circuit efficiency.

In a case of N=M, the design of the apparatus may be greatly simplified, since the identifying unit, the statistical multiplexer and the de-multiplexers are not needed any more.

Preferably, the apparatus according to the present invention may be included in either a base station or a user equipment.

According to another aspect of the present invention, a base station comprising the apparatus may be provided.

According to another aspect of the present invention, a user equipment comprising the apparatus may be provided.

According to another aspect of the present invention, a method of crest factor reduction may be provided. The method may comprise steps of: detecting a peak from an input signal on a corresponding one of a plurality of paths; statistically multiplexing a plurality of peaks respectively from the plurality of paths; allocating one of the multiplexed peaks to one of a plurality of peak cancellation units; generating, for the allocated peak, a cancellation peak; de-multiplexing the cancellation peak onto the corresponding one of the plurality of paths; summing the de-multiplexed cancellation peaks on one path; and subtracting the summed cancellation peaks from the input signal on the same path to obtain a peak-cancelled signal.

Preferably, the input signal is matched delayed before being subtracted by the summed cancellation peaks on the same path.

According to this aspect of the present invention, the efficiency of the method may be improved due to the statistical multiplexing of the plurality of input signals.

Preferably, the method may further comprise a step of: identifying which one of the plurality of paths the peak comes from, once the peak is detected.

Preferably, de-multiplexing the cancellation peak onto the corresponding path is performed according to a corresponding identifier output from the identifying step.

Preferably, the identifying step is a step of priority encoding, so that one or more of the plurality of paths have a higher priority to be processed.

Alternatively, the input signal is a time division multiplexed (TDM) signal and the peak-cancelled signal is a peak-cancelled TDM signal, and the method may further comprise steps of: time division multiplexing, according to a fixed order of time taps, signals from a plurality of ways into the TDM signal; and time division de-multiplexing, according to the fixed order of time taps, the peak-cancelled TDM signal onto the plurality of ways.

Preferably, the plurality of ways are N ways and the plurality of paths are [N/M] paths, where M is a TDM factor which is defined as a ratio of a system clock frequency and a signal sample rate, N and M are integers, and "[ ]" represents a ceil operation.

Preferably, the step of generating comprises: scaling a plurality of cancellation peak coefficients pre-stored in the peak cancellation unit which are read out once every M time taps with a phase and a magnitude difference between a magnitude and a predetermined threshold of the peak.

According to this aspect of the present invention, the method may further improve M times of the circuit efficiency.

In a case of N=M, the method may be greatly simplified, since the steps of statistically multiplexing and de-multiplexing and identifying may be omitted.

According to various aspect of the present invention, the statistical multiplexing solution as proposed in the present invention may overcome at least some of the disadvantages as previously discussed in the current PC-CFR techniques. The design of the circuit may be highly simplified, while the efficiency of the circuit may be highly improved.

BRIEF DESCRIPTION OF THE DRAWINGS

The objects, advantages and characteristics of the present invention will be more apparent, according to descriptions of preferred embodiments in connection with the drawings, wherein.

Figure 1A:
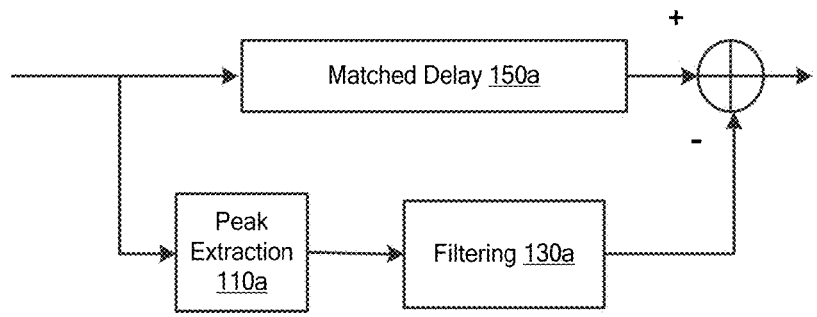
FIG. 1(a) illustratively shows a block diagram of a NS-CFR algorithm in the prior art.
Figure 1B:
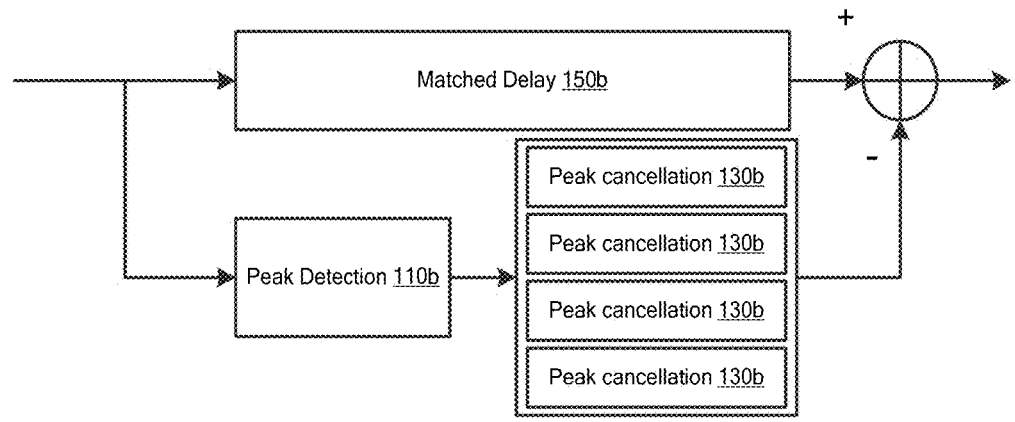
FIG. 1(b) illustratively shows a block diagram of a PC-CFR algorithm in the prior art.

It should be noted that various parts in the drawings are not drawn to scale, but only for an illustrative purpose, and thus should not be understood as any limitations and constraints on the scope of the present invention.

DETAILED DESCRIPTION OF PREFERRED EMBODIMENTS

Hereinafter, the present invention will be further described in detail by referring to the drawings and exemplary embodiments in order to make the objects, technical scheme and advantages of the present invention more apparent. In the description, details and functions which are unnecessary to the present invention are omitted for clarity. Similar reference numbers may be used for similar components throughout the drawings.

The following descriptions are based on a multicarrier LTE application scenario. However, it should be understood that the exemplary embodiments are only used for illustration but not for any limitation. The technical solutions of the present invention may also be used in any appropriate scenario, as will be appreciated by the skilled in the art.

Considering characteristics of randomicity and independency of signal peaks in the multicarrier LTE application scenario, an embodiment of the present invention proposes a PC-CFR scheme with statistical multiplexing.

Figure 4:
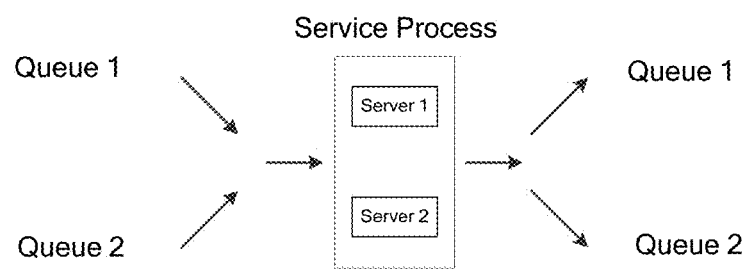
FIG. 4 illustratively shows a concept of statistical multiplexing for random service request arrival.

In order to better illustrate the embodiment of the present invention, a concept of statistical multiplexing for random service request may be firstly introduced in connection with FIG. 4. Statistical multiplexing may be widely used in all kinds of communication systems and data networks. In some applications, statistical multiplexing may also be known as resource pooling. As shown in FIG. 4, each server may be used for either of two queues by dynamic allocation when it is idle. Comparing with the case that each server works only for one queue, the probability of each server being occupied is higher, therefore an the efficiency of the whole system may be improved. According to a statistical analysis, the efficiency may be improved 2~4 times when a communication system is statistical multiplexed by multiple users.

Hereinafter, a block diagram of an exemplary PC-CFR unit with statistical multiplexing according to the embodiment of the present invention will be described with reference to FIG. 5.

Figure 2:
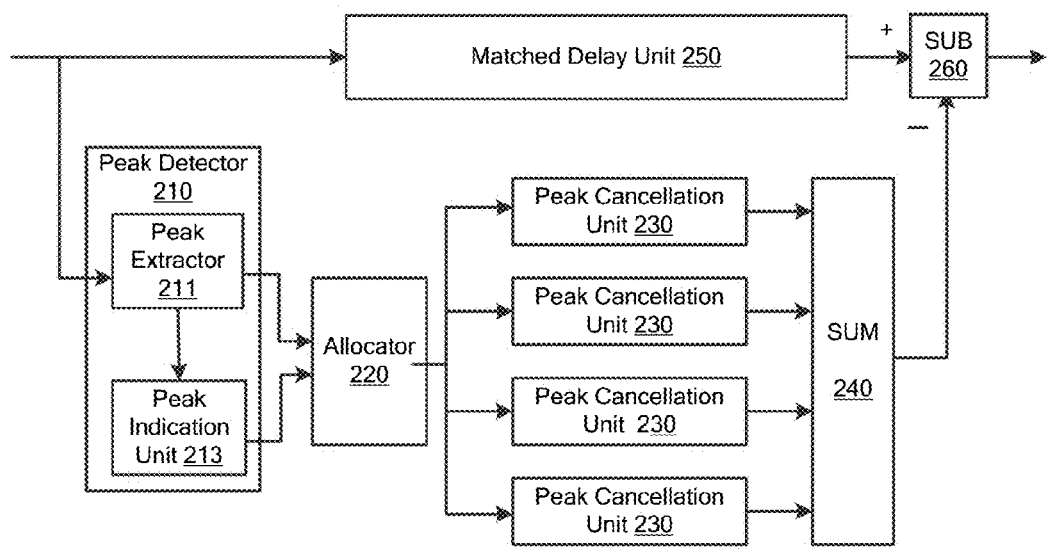
FIG. 2 illustratively shows a detailed block diagram of a PC-CFR unit using the PC-CFR algorithm in the prior art.
Figure 3:
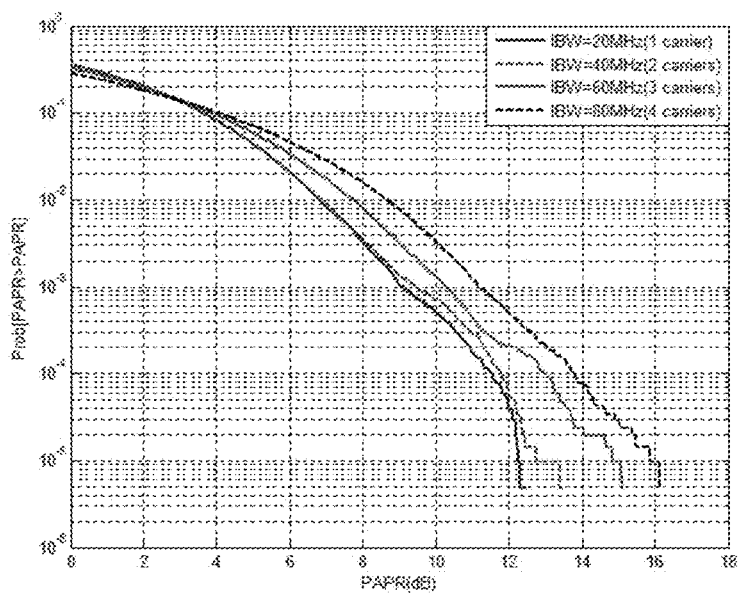
FIG. 3 illustratively shows an example that PAPR grows along with carrier number.

The PC-CFR unit 500 in the embodiment of the present invention may comprise a plurality of peak detectors 510s, summation units 540s, matched delay units 550s, subtraction units 560s same as those shown in FIG. 2 for respectively processing a plurality of input signals from a plurality of paths. For simplicity, descriptions on some functions performed by the same units as those in FIG. 2 are omitted. Furthermore, the PC-CFR unit 500 may comprise a pair of a multiplexer MUX unit 580 and multiple de-multiplexers DEMUX unit 590s as well as an identifying unit 570 as proposed in the present invention. Due to the statistical multiplexing, the PC-CFR unit 500 may need only one allocator 520 and corresponding multiple (in this example four) peak cancellation units 530s same as those shown in FIG. 2. The allocator 520, the multiplexer 580, and the de-multiplexers 590s may be connected to the identifying unit 570. The multiple de-multiplexers 590s may be arranged for receiving outputs from the multiple (in this example four) peak cancellation units 530s.

Figure 5:
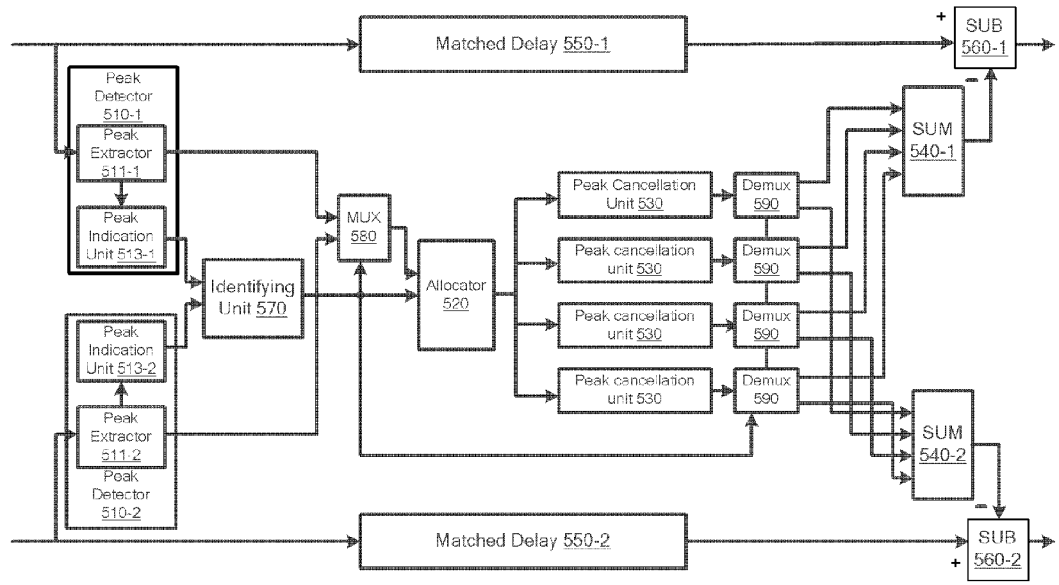
FIG. 5 illustratively shows a block diagram of an exemplary PC-CFR unit with statistical multiplexing according to an embodiment of the present invention.

In this example of FIG. 5, two input signals from two different paths are presented for illustration only but not for any limitation. As will be appreciated by the skilled in the art, other number of paths more than two may also be possible.

As shown in FIG. 5, the PC-CFR unit 500 may comprise two peak detectors 510-1 and 510-2 respectively corresponding to the two paths. Each peak detector 510 (here, the reference number "510" refers to any one of the two peak detectors 510-1 and 510-2 for easy description, similarly hereinafter) may be configured for detecting a peak from an input signal of a corresponding path. Same as the peak detector 210 of FIG. 2, the peak detector 510 may comprise a peak extractor 511 and a peak indication unit 513. The peak extractor 511 may be configured for calculating a magnitude and a phase of the input signal from one of the two paths, and obtaining a magnitude difference $D_{Mag}$ between the magnitude and the predetermined clipping threshold. As previously described, the threshold may be determined based on the PARP requirement and the average power of the input signal. The peak indication unit 513 may be configured for indicating a maximum value of the $D_{Mag}$s as a peak indicator for a peak of the input signal on the corresponding path.

Since the peaks from different two paths will be statically multiplexed, the identifying unit 570 is necessary for identifying, using a generated identifier, which path a peak comes from, according to the peak indicators on different paths respectively output from the peak indication units 513-1 and 513-2 to the identifying unit 570.

Preferably, the identifying unit 570 may be an encoder. When there comes a peak, the peak indication unit 513 may send a bit "1" as a peak indicator to the identifying unit 570. The identifying unit 570 may identify which path the bit "1" comes from, using generated encoded bits. For example, if the input bit "1" comes from Path 2, the encoder may encode it as 2, i.e., "10". However, it will be appreciated by the skilled in the art, any other identifying method as appropriate may be possible.

Then the identifying unit 570 may send the generated identifier to the MUX unit 580 for indicating the path on which the peak should be sent to the allocator 520 and peak cancellation units 530s and be processed. Also, the identifier may be sent to the DEMUX units 590s after each peak cancellation unit 530 to choose which path the processing result should be sent back to. The identifying unit 570 may be designed as a priority encoder, and then some of the signal paths may have a higher priority to be processed. The identifying unit 570 may also be designed as a round robin encoder, and then each path would have the same priority.

Although the identifying unit 570 and the MUX unit 580 are separated components as shown in FIG. 5, the identifying unit 570 may be also incorporated into the MUX unit 580, as will be appreciated by the skilled in the art.

The detected peaks of the input signals from the two paths may be input to the MUX unit 580. Then, the MUX unit 580 may statistically multiplexing the detected peaks from the peak detectors 510-1 and 510-2, and output the multiplexed peaks to the allocator 520.

The allocator 520 may allocate each of the multiplexed peaks to one of the peak cancellation unit 530, once it receives the peak from the MUX unit 580. The allocator 520 may know which path the peak of the input signal comes from, according to the identifier output from the identifying unit 570. The peak cancellation unit 530 may generate a corresponding cancellation peak for the allocated peak from the identified path. Same as the configuration of the PC-CFR unit 200, there are four peak cancellation units 530s as an example for illustration only but not for any limitation. Each peak cancellation unit 530 may cancel only one peak at a time. The length of the cancellation peak combined with the number of the peak cancellation units 530s may determine a rate at which the multiplexed peaks may be cancelled. The number of the peak cancellation units 530s may depend on at least one of a carrier number, a carrier bandwidth, and statistic characteristics of carrier.

In order to avoid introducing out-of-band interference, the cancellation peak may be designed to have a spectrum that matches that of the input signal. The spectrum of the cancellation peak in a frequency domain may correspond to cancellation peak coefficients in a time domain. The cancellation peak coefficients may be predetermined depending on a carrier configuration including the carrier number, the carrier frequency and the carrier bandwidth etc., and pre-stored in the RAM of the peak cancellation unit 530.

Once the multiplexed peak is allocated to the peak cancellation unit 530, these cancellation peak coefficients will be read out sequentially for the multiplexed peak, as previously discussed. Thus, the cancellation peak may be generated by scaling the plurality of cancellation peak coefficients pre-stored in the peak cancellation unit 530 with the magnitude difference $D_{Mag}$ and the phase of the allocated peak.

Each DEMUX unit 590 may be connected to each peak cancellation unit 530. The DEMUX unit 590 may de-multiplex the generated cancellation peak onto the corresponding path according to the identifier output from the identifying unit 570, so as to choose which path the processing result should be sent back to.

In this example, there are two outputs from each DEMUX unit 590. Then, the outputs from all of the four DEMUX units 590s may be further output to the summation units 540-1 and 540-2 respectively. The summation unit 540 may sum the de-multiplexed cancellation peaks of the input signal on one and the same path together. And then the subtraction unit 560 may subtract the summed cancellation peaks from a delayed input signal which may be delayed by the corresponding matched delay unit 550.

Hereinafter, a flowchart of an exemplary PC-CFR method performed by the PC-CFR unit 500 according to the above embodiment of the present invention will be described with reference to FIG. 6.

Figure 6:
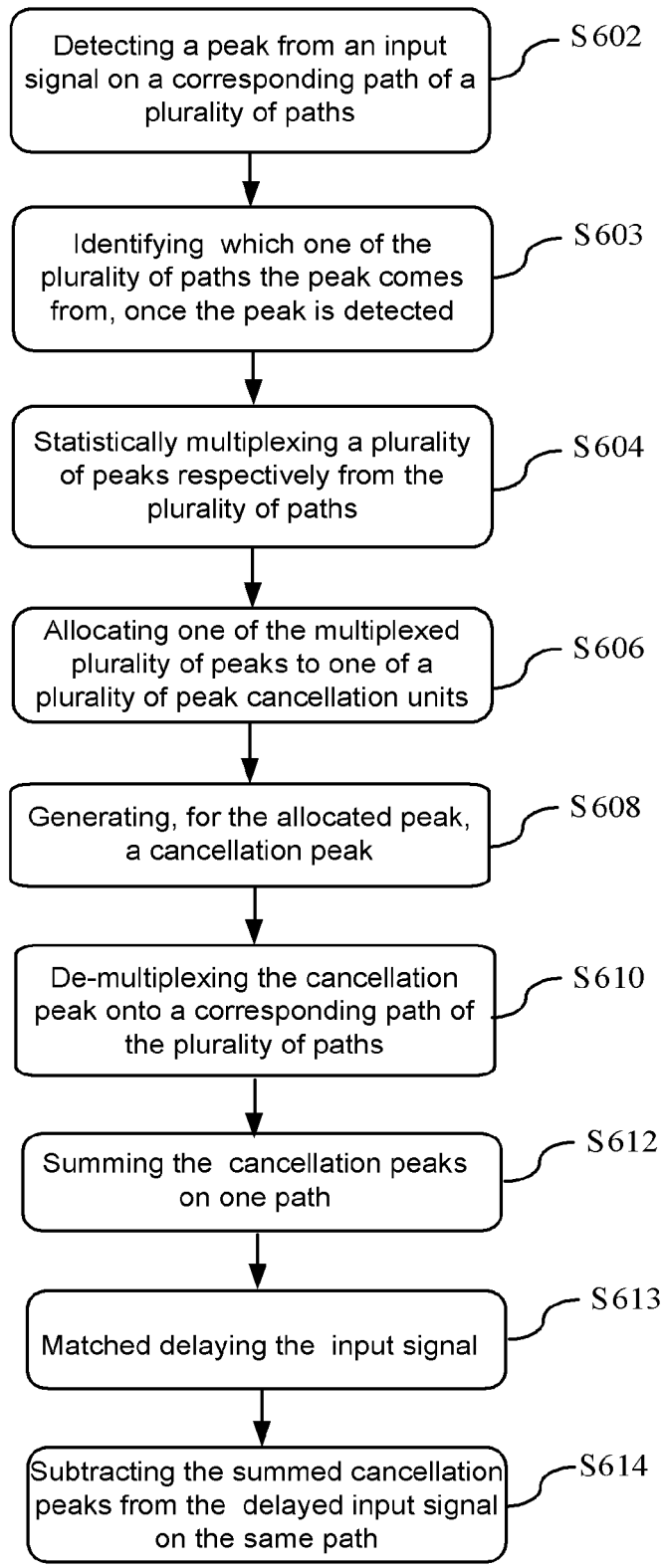
FIG. 6 shows an illustrative flowchart of an exemplary PC-CFR method with statistical multiplexing according to an embodiment of the present invention.

FIG. 6 shows an illustrative flowchart of the exemplary PC-CFR method 600.

In step S602, the peak detector 510 may detect a peak from an input signal on a corresponding path. In particular, the peak extractor 511 may calculate a magnitude and a phase of the input signal, and obtain a magnitude difference $D_{Mag}$ between the magnitude and a predetermined clipping threshold. And the peak indication unit 513 may indicate a maximum value of the $D_{Mag}$s as a peak indicator for a peak of the input signal on the corresponding path.

In step S604, the MUX unit 580 may statistically multiplex the plurality of detected peaks respectively from the plurality of paths. The path from which the detected peak comes may be identified in step S603 by the identifying unit 570 using a generated identifier, according to the peak indicators on different paths respectively output from the peak indication units 513s to the identifying unit 570.

In step S606, the allocator 520 may allocate one of the multiplexed peaks to one of the plurality of peak cancellation units 530.

In step S608, the peak cancellation unit 530 may generate the corresponding cancellation peak for the allocated peak from the identified path. The cancellation peak may be generated by scaling a plurality of cancellation peak coefficients pre-stored in the peak cancellation unit with the magnitude difference $D_{Mag}$ and a phase of the allocated peak.

In step S610, the DEMUX unit 590 may de-multiplex the corresponding cancellation peak onto the corresponding one of the plurality of paths according to the identifier output from the identifying unit 570, so as to choose which path the processing result should be sent back to.

In step S612, the summation unit 540 may sum the de-multiplexed cancellation peaks of the input signal on one and the same path together.

In step S614, the subtraction unit 560 may subtract the summed cancellation peaks from a delayed input signal which may be delayed in step S613 by the corresponding matched delay unit 550.

In another embodiment of the present invention, the PC-CFR unit 500 with statistical multiplexing as shown in FIG. 5 may also be integrated with Time Division Multiplexing (TDM).

Assuming a TDM factor is M which is defined as a ratio of a system clock frequency and a signal sample rate, and there are N ways of input signals, where M and N are integers.

In this embodiment, all the N ways of input signals may be divided into [N/M] groups, where "[ ]" represents a ceil operation. The "group" here corresponds to the "path" in the embodiment of FIG. 5. That is, processings on the "group" here correspond to those on the "path" in the embodiment of FIG. 5.

Generally, the number of ways N is no less than the TDM factor M (if N<M, (M−N) ways will be filled with 0 for further processing). Inside each group, an order of TDM time taps may be used for differentiating the different ways of input signals, while between different groups, the identifying unit, the MUX unit and the DEMUX unit as shown in FIG. 5 may be used for differentiating the different groups. From this point of view, FIG. 5 may be regarded as a specific case of this embodiment, in which the TDM factor is 1, i.e. the data sample rate is equal to the system clock frequency.

Figure 7:
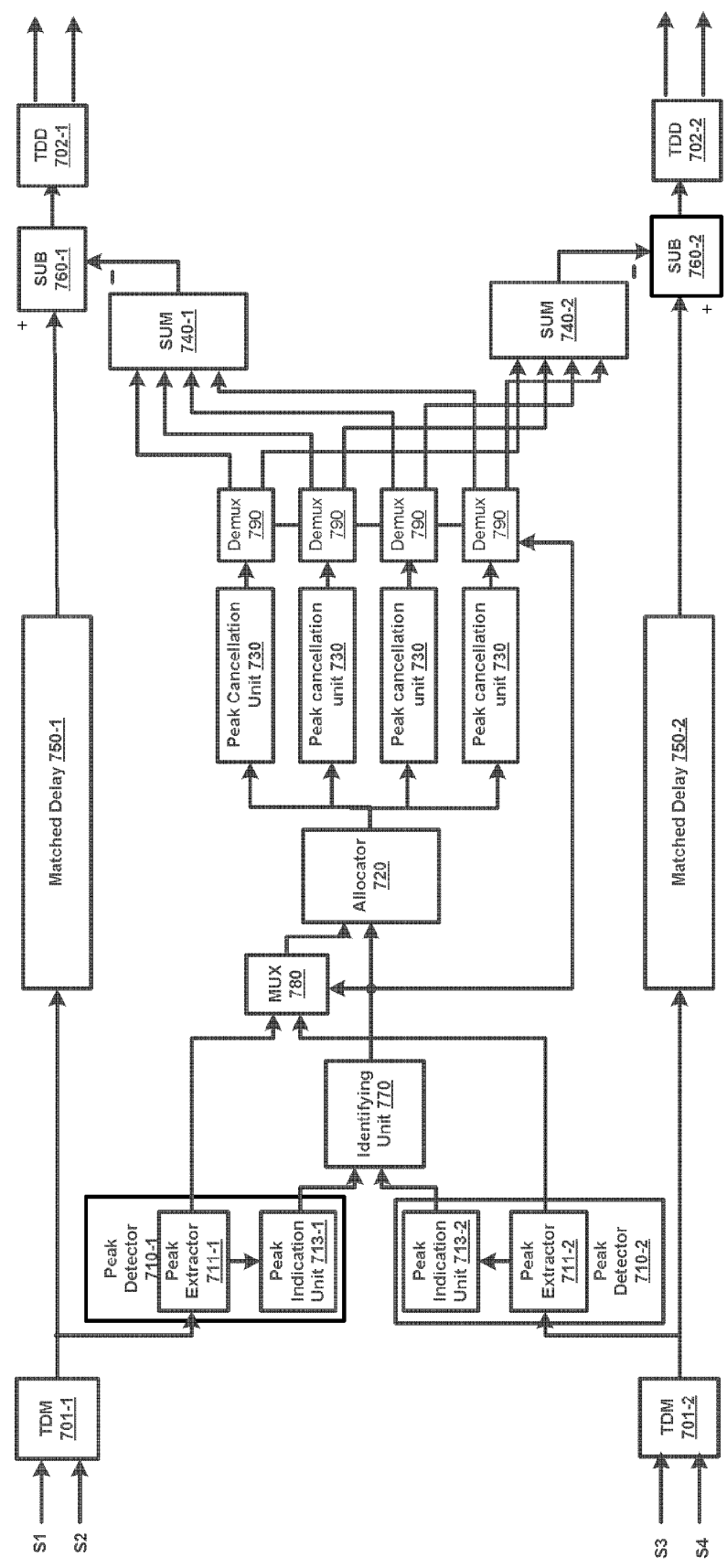
FIG. 7 illustratively shows a block diagram of an exemplary general PC-CFR unit with a combination of statistical multiplexing and Time Division Multiplexing (TDM) according to an embodiment of the present invention.

Hereinafter, a block diagram of the exemplary PC-CFR unit with a combination of statistical multiplexing and TDM according to the present embodiment will be described in detail in connection with an example as shown in FIG. 7.

In the example of FIG. 7, the number of ways is four, and the TDM factor is two. As previously described, the four ways of input signals S1, S2, S3 and S4 may be divided into two groups. Group 1 includes two ways of input signals S1 and S2, and Group 2 includes two ways of input signals S3 and S4.

The PC-CFR unit 700 in the present embodiment may comprise a plurality of peak detectors 710s, an allocator 720, multiple peak cancellation units 730, summation units 740s, matched delay units 750s, subtraction units 760s, an identifying unit 770, a MUX unit 780 and multiple DEMUX units 790s same as those shown in FIG. 5. For simplicity, descriptions on some functions performed by the same units as those in FIG. 5 are omitted. Furthermore, the PC-CFR unit 700 may comprise pairs of TDMs 701s and TDDs 702s.

Group 1 is taken as an example for illustration. Same description may apply to Group 2, and thus is omitted for simplicity. A TDM unit 701-1 may combine sequentially the input signals S1 and S2 respectively from the two ways into a multiplexed input signal (hereinafter, a TDM signal) $S_{12}$ by time division multiplexing. A peak detector 710-1 may detect a peak from the input TDM signal $S_{12}$ from Group 1. Due to a fixed order of TDM, the signals S1 and S2 in the TDM signal may be differentiated by the TDM time taps. For example, odd time taps may refer to peaks of the signal S1, and even time taps may refer to peaks of the signal S2.

Since the peaks from Group 1 and Group 2 will be statically multiplexed, an identifying unit 770 is necessary for identifying, using a generated identifier, which group a peak comes from, according to the peak indicators for different TDM signals respectively output from the peak indication units 713-1 and 713-2 to the identifying unit 770.

Similar with the identifying unit 570, the identifying unit 770 may preferably be an encoder. When there comes a peak, the peak indication unit 713 for the corresponding group may send a bit "1" as a peak indicator to the identifying unit 770. The identifying unit 770 may identify which group the bit "1" comes from, using generated identifiers. For example, if the input bit "1" comes from Group 2, the encoder may encode it as 2, i.e., "10". However, it will be appreciated by the skilled in the art, any other identifying method as appropriate may be possible.

Then the identifying unit 770 may send the generated identifier to the MUX unit 780 for indicating the group on which the peak should be sent to the allocator 720 and peak cancellation units 730s and be processed. Also, the identifier may be sent to the DEMUX units 790s after each peak cancellation unit 730 to choose which group the processing result should be sent back to. The identifying unit 770 may be designed as a priority encoder, and then some of the groups may have a higher priority to be processed. The identifying unit 570 may also be designed as a round robin encoder, and then each group would have the same priority.

Then, the detected peaks of the TDM signals from Group 1 and Group 2 may be input to the MUX unit 780. Then, the MUX unit 780 may statistically multiplexing the detected peaks from the peak detectors 710-1 and 710-2, and output the multiplexed peaks to the allocator 720.

The allocator 720 may allocate one of the multiplexed peaks to one of the peak cancellation unit 530, once it receives the peak from the MUX unit 780. The allocator 720 may know which group the peak of the input signal comes from, according to the identifier output from the identifying unit 770 and the specific time tap for the peak. In particular, assuming that odd time taps refer to peaks of the signal S1 in Group 1 and peaks of the signal S3 in Group 2, and even time taps refer to peaks of the signal S2 in Group 1 and peaks of the signal S4 in Group 2, the allocator 720 may be aware that the odd time taps refer to the peaks of the signal S1 or the peaks of the signal S3 according to the identifier output from the identifying unit 770.

The peak cancellation unit 730 may generate a corresponding cancellation peak for the allocated peak from the identified group. Same as the configuration of the PC-CFR unit 200, there are four peak cancellation units 730s as an example for illustration only but not for any limitation. Each peak cancellation unit 730 may cancel only one peak at a time. The only difference is that the peak cancellation coefficients stored in the RAMs inside the peak cancellation unit 730 are read out once every M time taps and properly delayed to align with the corresponding way of input signal. The length of the cancellation peak together with the number of the peak cancellation units 730s may determine the rate at which the multiplexed peaks may be cancelled. The number of the peak cancellation units 730s may depend on at least one of a carrier number, a carrier bandwidth, and statistic characteristics of carrier.

Each DEMUX unit 790 may be connected to each peak cancellation unit 730. The DEMUX unit 790 may de-multiplex the generated cancellation peak onto the corresponding group according to the identifier output from the identifying unit 770, so as to choose which group the processing result should be sent back to.

In this example, there are two outputs from each DEMUX unit 790. Then, the outputs from all of the four DEMUX units 790s may be further output to the summation units 740-1 and 740-2 respectively. The summation unit 740 may sum the de-multiplexed cancellation peaks of the TDM signal on one and the same group together. And then the subtraction unit 760 may subtract the summed cancellation peaks from a delayed TDM signal which may be delayed by the corresponding matched delay unit 750, so as to obtain a peak-cancelled TDM signal.

Then, the peak-cancelled TDM signal from the subtraction unit 760 may be input to the TDD unit 702. The TDD unit 702 may separate the peak-cancelled TDM signal onto the corresponding way according to the fixed order of time taps.

Hereinafter, a flowchart of an exemplary PC-CFR method performed by the PC-CFR unit 700 according to the above embodiment of the present invention will be described with reference to FIG. 8.

Figure 8:
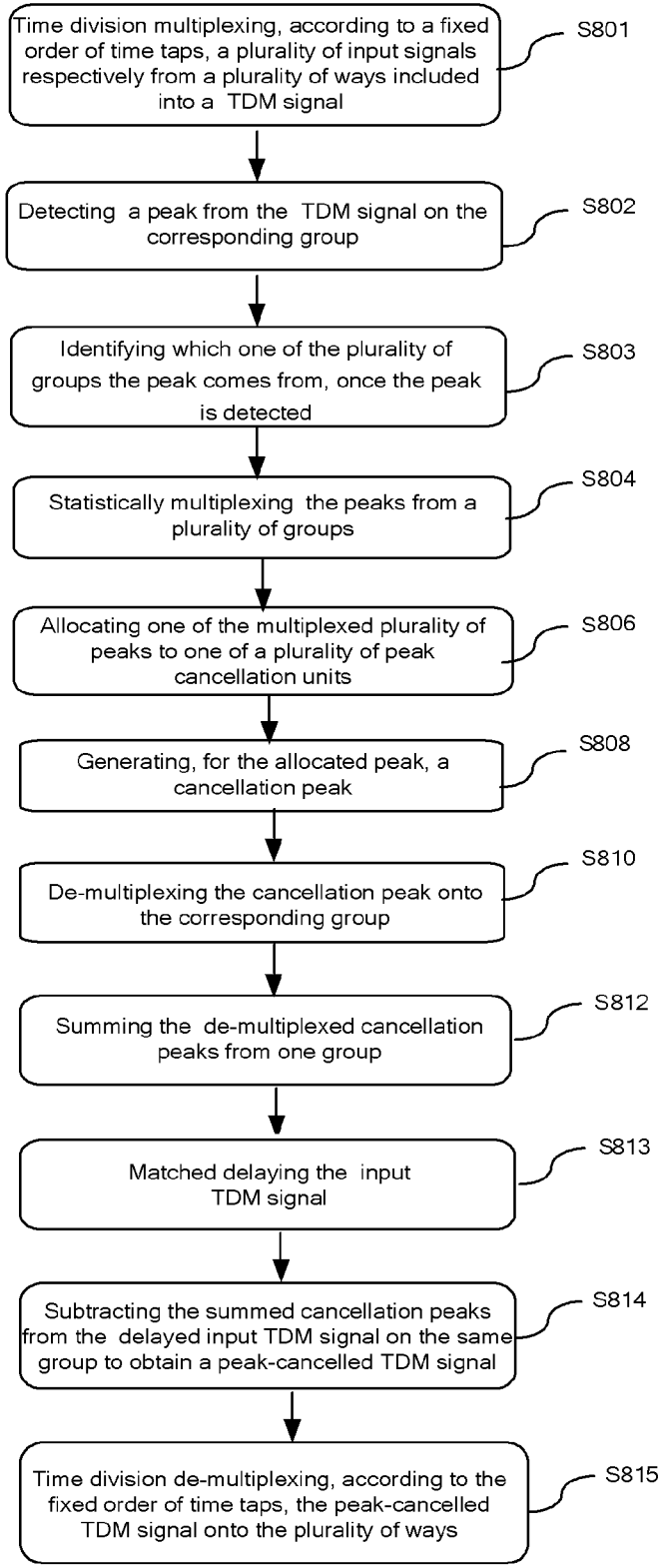
FIG. 8 illustratively shows a block diagram of an exemplary specific PC-CFR unit with a combination of statistical multiplexing and Time Division Multiplexing (TDM) according to an embodiment of the present invention.

FIG. 8 shows an illustrative flowchart of the exemplary PC-CFR method 800.

In step S801, the TDM unit 701 may time division multiplexing, according to a fixed order of time taps, a plurality of input signals respectively from a plurality of ways into an TDM signal.

In step S802, the peak detector 710 may detect a peak from the TDM signal on the corresponding group. In particular, the peak extractor 711 may calculate a magnitude and a phase of the TDM signal, and obtain a magnitude difference $D_{Mag}$ between the magnitude and a predetermined clipping threshold. And the peak indication unit 713 may indicate a maximum value of the $D_{Mag}$s as a peak indicator for a peak of the TDM signal on the corresponding group.

In step S804, the MUX unit 880 may statistically multiplex the plurality of detected peaks respectively from the plurality of groups. The group from which the detected peak comes may be identified in step S803 by the identifying unit 770 using a generated identifier, according to the peak indicators on different groups respectively output from the peak indication units 713s to the identifying unit 770.

In step S806, the allocator 820 may allocate one of the multiplexed plurality of peaks to one of the plurality of peak cancellation units 730.

In step S808, the peak cancellation unit 730 may generate the corresponding cancellation peak for the allocated peak from the identified group. The cancellation peak may be generated by scaling a plurality of cancellation peak coefficients pre-stored in the peak cancellation unit with the magnitude difference $D_{Mag}$ and a phase of the allocated peak. The plurality of cancellation peak coefficients may be read out once every M time taps, in order to differentiate different ways in one group from which the peaks come from.

In step S810, the DEMUX unit 790 may de-multiplex the corresponding cancellation peak onto the corresponding one of the plurality of groups according to the identifier output from the identifying unit 770, so as to choose which group the processing result should be sent back to.

In step S812, the summation unit 740 may sum the de-multiplexed cancellation peaks of the TDM signal from one and the same group together.

In step S814, the subtraction unit 760 may subtract the summed cancellation peaks from a delayed TDM signal which may be delayed in step S813 by the corresponding matched delay unit 750 to obtain a peak-cancelled TDM signal.

In step S815, the TDD unit 702 may time division de-multiplexing, according to the fixed order of the time taps, the peak-cancelled TDM signal outputted from the subtraction unit 760 onto the plurality of ways.

The PC-CFR unit 700 using the PC-CFR method 800 in the above embodiment of the present invention may improve M times of the circuit efficiency, compared with the PC-CFR unit 500 using the PC-CFR method 600 in the previous embodiment of the present invention.

If the TDM factor M is equal to the number of paths N, there is only one group including a plurality of ways of input signals. The identifying unit 770, the MUX unit 780 and the DEMUX unit 790 as illustrated in FIG. 7 are not needed any more for differentiating different groups. Thus, the design of the PC-CFR unit in this embodiment may be highly simplified.

Figure 9:
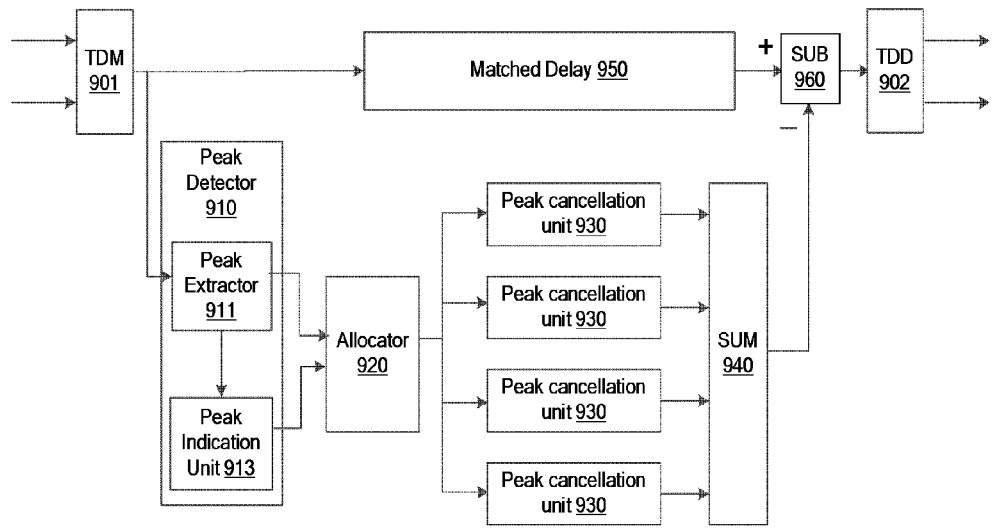
FIG. 9 shows an illustrative flowchart of an exemplary PC-CFR method with statistical multiplexing and Time Division Multiplexing (TDM) according to an embodiment of the present invention.

FIG. 9 illustratively shows a block diagram of the PC-CFR unit 900, where the TDM factor M is equal to the number of ways of input signals N (which is two in this example for illustration only).

The PC-CFR unit 900 may comprise a TDM unit 901 for combining incoming signals of two ways, and a TDD unit 902 for separating them onto the corresponding way respectively. According to the principle of TDM, different ways may be differentiated by the fixed order of time taps. As previously mentioned, the identifying unit 770, the MUX unit 780 and the DEMUX unit 790 as illustrated in FIG. 7 are not needed any more in this case for differentiating the different groups. However, to ensure that the peak cancellation waveform is aligned with the signal paths, the peak cancellation coefficients pre-stored in the peak cancellation unit 930 should be read out once every M (two in this example) clock cycle and delayed by a proper number of clock cycles.

The PC-CFR method as performed by the PC-CFR unit 900 are similar with the PC-CFR method 800 as previously described, except that the steps S803, S804 and S810 may be omitted. Thus, the description on the PC-CFR method of the PC-CFR unit 900 are omitted for simplicity.

As previously described, the PC-CFR unit 900 in this embodiment of the present invention may greatly simplify the design of the PC-CFR unit, compared with the PC-CFR unit 700 in the previous embodiment of the present invention.

Figure 10:
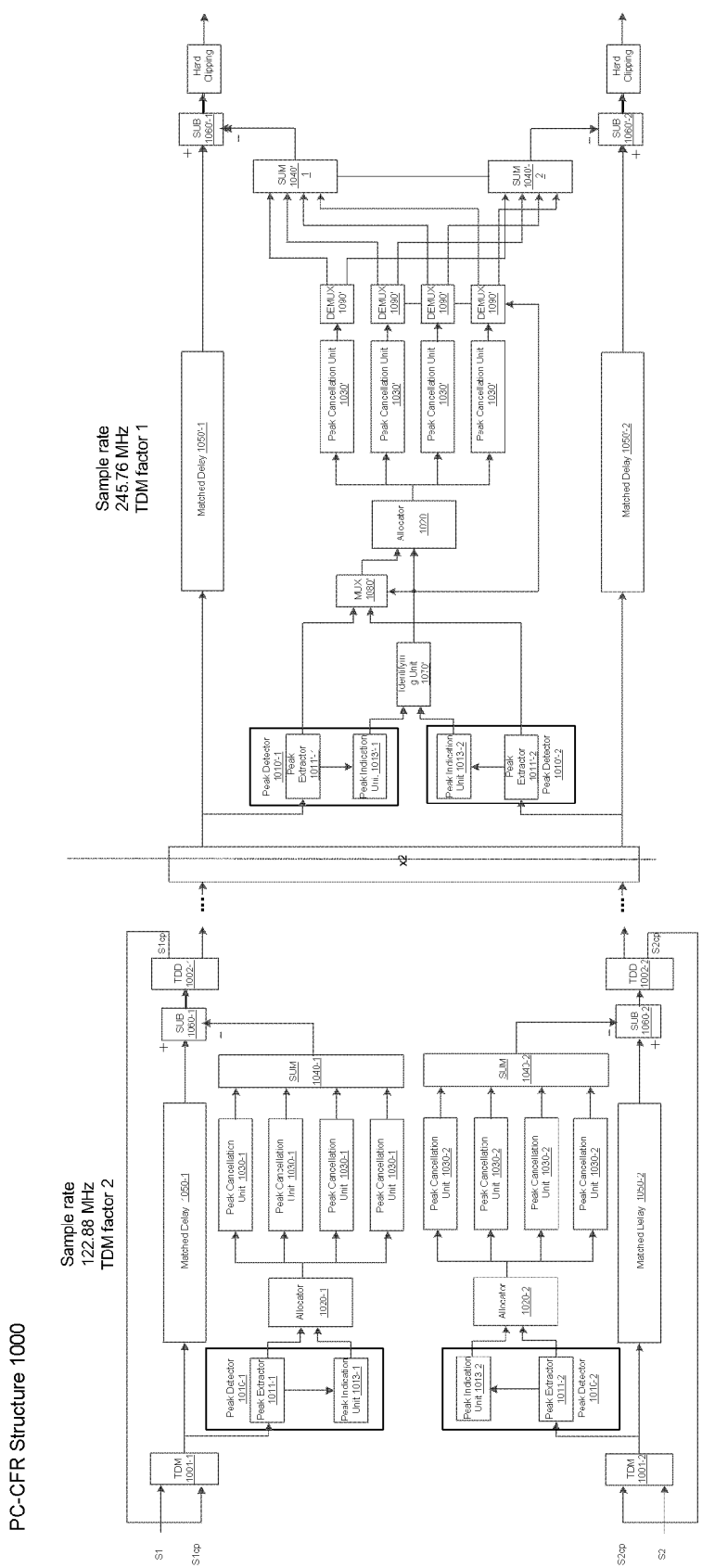
FIGS. 10 and 11 illustratively show block diagrams of CFR solutions in a multicarrier LTE system according to an embodiment of the present invention.

FIG. 10 shows a block diagram of a CFR solution in the multicarrier LTE system, which is an exemplary application of the above embodiments.

In the example of FIG. 10, there are two paths of input signals S1 and S2 corresponding to two antennas, and each path has three stages of clipping. It should be noted that the exemplary solution as shown in FIG. 10 is only described for illustration only but not for any limitation. The skilled in the art may use any appropriate combinations of the embodiments as proposed in the present invention for actual circuit designs.

As shown in FIG. 10, the first two stages are working at the sample rate of 122.88 MHz, and the last stage is working at the sample rate of 245.76 MHz after an ×2 interpolation. System clock is 245.76 MHz.

The reason to put different clipping stages at different sample rates is to keep a balance between hardware resource consumption and clipping performance, because clipping at a lower sample rate can employ time division multiplexing and help to save hardware resource, while clipping at a higher sample rate can mitigate the peak re-growth after interpolation and get a better PAPR performance.

For the first two stages of each path, a PC-CFR structure like the PC-CFR unit 900 as shown in FIG. 9 may be employed. As shown in FIG. 10, the input signal S1 and an peak-cancelled input signal $S1_{cp}$ output from an TDD unit 1002 are combined in an TDM unit 1001, so that the PC-CFR method same as what performed by the PC-CFR unit 900 is between different clipping stages instead of different paths. As such, the TDM factor is equal to the number of stages in this example, instead of the number of paths. It should be noted that before the peak-cancelled input signal $S1_{cp}$ is generated, this input of the TDM unit 1001 is filled with 0 for initial processing. The PC-CFR operation performed in both of the first two clipping stages in FIG. 10 is identical with that of the PC-CFR unit 900. Thus, corresponding descriptions are omitted for simplicity.

Figure 11:
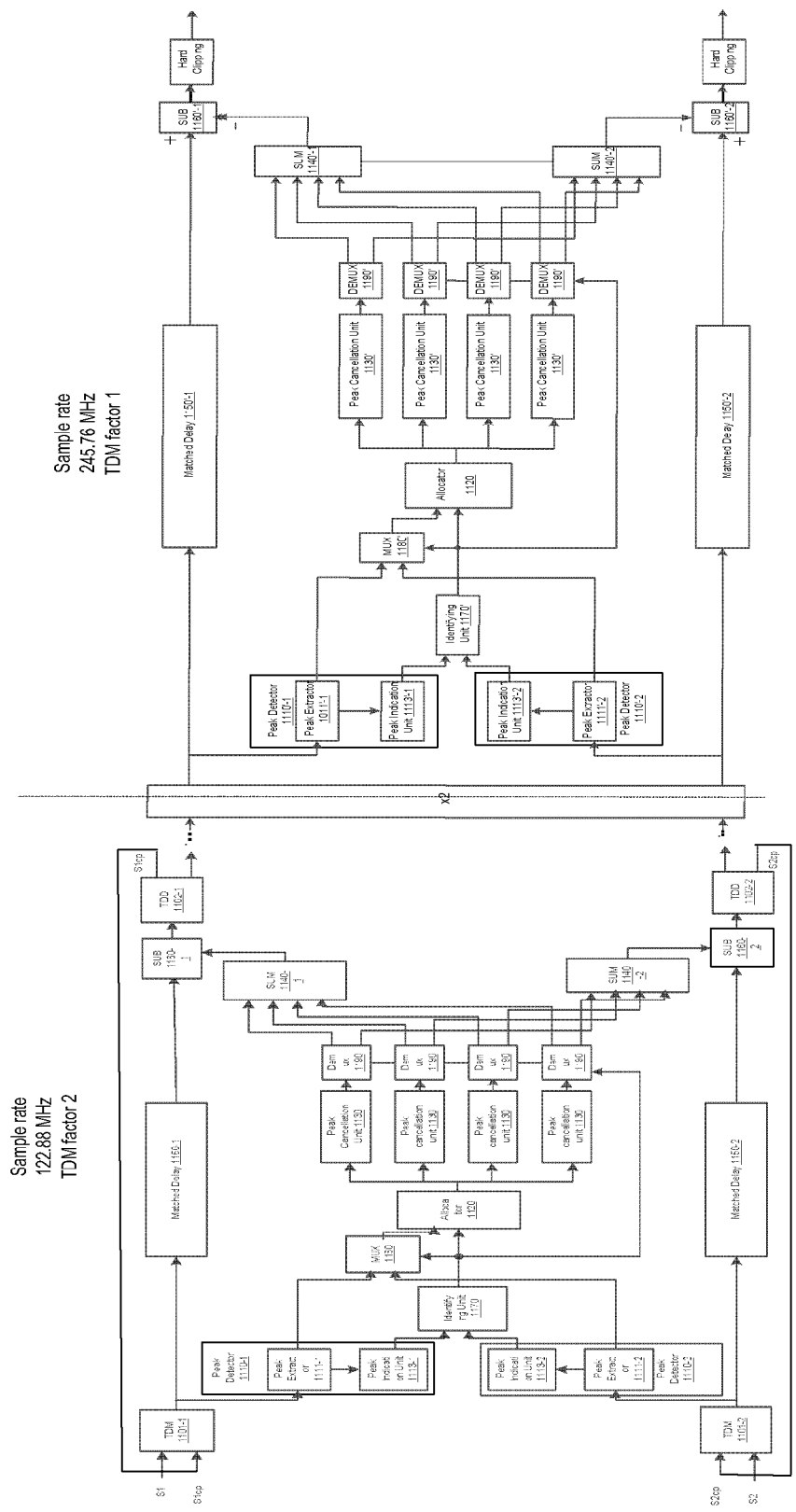

Alternatively, a PC-CFR structure like the PC-CRF unit 700 as shown in FIG. 7 may be used for the first two stages of both two paths. Similarly, as shown in FIG. 11, the input signal S1 and the peak-cancelled input signal $S1_{cp}$ output from an TDD unit 1102 are combined in an TDM unit 1101, so that the PC-CFR method same as the method 800 performed by the PC-CFR unit 700 is between different clipping stages instead of different paths. Again, before the peak-cancelled input signal $S1_{cp}$ is generated, this input of the TDM unit 1101 is filled with 0 for initial processing. The PC-CFR operation performed in both of the first two clipping stages in FIG. 11 is identical with that of the PC-CFR unit 700. Thus, corresponding descriptions are omitted for simplicity.

Obviously, the only difference between the above two approaches is that two PC-CFR units 900s are needed for the two paths of input signals as shown in FIG. 10, while only one PC-CFR unit is needed for the two paths of input signals as shown in FIG. 11.

The two paths of input signals S1 and S2 after the first two clipping stage may be ×2 interpolated for the last clipping stage working at the sample rate of 245.76 MHz, since the sample rate is equal to the system clock rate. A PC-CFR structure like the PC-CRF unit 500 as shown in FIG. 5 may be employed. Statistical multiplexing may be used between two signal paths. Since structures and functions of this PC-CFR structure are identical with those of the PC-CFR unit 500, the descriptions are omitted for simplicity.

Furthermore, if needed, more clipping stages working at 122.88 MHz sample rate may be added, and fractional delay filter may also be employed between stages. Hard clipping, which is a hard magnitude limiter, is used to avoid peak leakage in extreme conditions, too.

The PC-CFR unit as proposed in the present invention may be included in a transceiver of either a base station or a user equipment. That is, the base station or the user equipment may comprise such a PC-CFR unit according to the present invention in its transceiver.

The above is only the preferred embodiments of the present invention and the present invention is not limited to the above embodiments. Therefore, any modifications, substitutions and improvements to the present invention are possible without departing from the spirit and scope of the present invention.

What is claimed is:

1. An apparatus for crest factor reduction, comprising:
a plurality of peak detectors respectively corresponding to a plurality of paths, each peak detector being configured for detecting a peak from one input signal on one corresponding path of the plurality of paths;
a statistical multiplexer, configured for statistically multiplexing the peaks from the plurality of peak detectors;
an allocator, configured for allocating one of the multiplexed peaks to one of a plurality of peak cancellation units;
the plurality of peak cancellation units, each configured for generating, for an allocated peak, a cancellation peak;
a plurality of de-multiplexers respectively corresponding to the plurality of peak cancellation units, each de-multiplexer being configured for de-multiplexing an cancellation peak onto one corresponding path of the plurality of paths;
a plurality of summation units respectively corresponding to the plurality of paths, each configured for summing the de-multiplexed cancellation peaks on one corresponding path of the plurality of paths; and
a plurality of subtraction units corresponding to the plurality of paths, each configured for subtracting the summed cancellation peaks from one of the input signals on one corresponding path of the plurality of paths to obtain a peak-cancelled signal.

2. The apparatus according to claim 1, further comprising a plurality of matched delay units corresponding to one corresponding path of the plurality of paths, each configured for matched-delaying one of the input signals before being subtracted by the summed cancellation peaks on the one corresponding path of the plurality of paths.

3. The apparatus according to claim 1, further comprising:
an identifying unit connected to the plurality of peak detectors, configured for identifying which one of the plurality of paths the peak comes from, once the peak is detected.

4. The apparatus according to claim 3, wherein the de-multiplexer is configured to de-multiplex the cancellation peak onto the corresponding path according to a corresponding identifier output from the identifying unit.

5. The apparatus according to claim 3, wherein the identifying unit is a priority encoder, so that one or more of the plurality of paths have a higher priority to be processed.

6. The apparatus according to claim 1, wherein the input signal is a time division multiplexed (TDM) signal and the peak-cancelled signal is a peak-cancelled TDM signal, and the apparatus further comprises:
a plurality of time division multiplexing units respectively connected to the plurality of peak detectors, each configured for multiplexing, according to a fixed order of time taps, signals from a plurality of ways into the TDM signal; and
a plurality of time division de-multiplexing units respectively connected to the plurality of subtraction units, each configured for de-multiplexing, according to the fixed order of the time taps, the peak-cancelled TDM signal output from the subtraction unit onto the plurality of ways.

7. The apparatus according to claim 1, wherein the apparatus is included in either a base station or a user equipment.

8. A base station, comprising:
an apparatus, the apparatus including:
a plurality of peak detectors respectively corresponding to a plurality of paths, each peak detector being configured for detecting a peak from one input signal on one corresponding path of the plurality of paths;
a statistical multiplexer, configured for statistically multiplexing the peaks from the plurality of peak detectors;
an allocator, configured for allocating one of the multiplexed peaks to one of a plurality of peak cancellation units;
the plurality of peak cancellation units, each configured for generating, for an allocated peak, a cancellation peak;
a plurality of de-multiplexers respectively corresponding to the plurality of peak cancellation units, each de-multiplexer being configured for de-multiplexing an cancellation peak onto one corresponding path of the plurality of paths;
a plurality of summation units respectively corresponding to the plurality of paths, each configured for summing the de-multiplexed cancellation peaks on one corresponding path of the plurality of paths; and
a plurality of subtraction units corresponding to the plurality of paths, each configured for subtracting the summed cancellation peak from one of the input signals on one corresponding path of the plurality of paths to obtain a peak-cancelled signal.

9. A user equipment, comprising:
an apparatus, the apparatus including:
a plurality of peak detectors respectively corresponding to a plurality of paths, each peak detector being configured for detecting a peak from one input signal on one corresponding path of the plurality of paths;
a statistical multiplexer, configured for statistically multiplexing the peaks from the plurality of peak detectors;
an allocator, configured for allocating one of the multiplexed peaks to one of a plurality of peak cancellation units;
the plurality of peak cancellation units, each configured for generating, for an allocated peak, a cancellation peak;
a plurality of de-multiplexers respectively corresponding to the plurality of peak cancellation units, each de-multiplexer being configured for de-multiplexing an cancellation peak onto one corresponding path of the plurality of paths;
a plurality of summation units respectively corresponding to the plurality of paths, each configured for summing the de-multiplexed cancellation peaks on one corresponding path of the plurality of paths; and
a plurality of subtraction units corresponding to the plurality of paths, each configured for subtracting the summed cancellation peaks from one of the input signals on one corresponding path of the plurality of paths to obtain a peak-cancelled signal.

10. A method of crest factor reduction, comprising:
detecting a peak from an input signal of a plurality of signals each on a corresponding one path of the plurality of paths;
statistically multiplexing a plurality of peaks respectively from the plurality of paths;

allocating each of the multiplexed peaks to one of a plurality of peak cancellation units;

generating, for each of the allocated peak, a cancellation peak;

de-multiplexing the cancellation peak onto the corresponding one path of the plurality of paths;

summing the de-multiplexed cancellation peaks on the corresponding one path of the plurality of paths; and subtracting the summed cancellation peaks from the input signal on the corresponding one path of the plurality of paths to obtain a peak-cancelled signal.

11. The method according to claim 10, wherein the input signal is matched delayed before being subtracted by the summed cancellation peaks on the one corresponding path of the plurality of paths.

12. The method according to claim 10, further comprising:

identifying which one of the plurality of paths the peak comes from, once the peak is detected.

13. The method according to claim 12, wherein de-multiplexing the cancellation peak onto the corresponding path is performed according to a corresponding identifier output from the identifying.

14. The method according to claim 12, wherein the identifying step is a step of priority encoding, so that one or more of the plurality of paths have a higher priority to be processed.

15. The method according to claim 10, wherein the input signal is a time division multiplexed (TDM) signal and the peak-cancelled signal is a peak-cancelled TDM signal, and the method further comprising:

time division multiplexing, according to a fixed order of time taps, signals from a plurality of ways into the TDM signal; and time division de-multiplexing, according to the fixed order of time taps, the peak-cancelled TDM signal onto the plurality of ways.

16. The method according to claim 15, wherein the plurality of ways are N ways and the plurality of paths are [N/M] paths, and wherein M is a TDM factor defined as a ratio of a system clock frequency and a signal sample rate, N and M are integers, and "[ ]" represents a ceil operation.

17. The method according to claim 16, wherein the generating comprises:

scaling a plurality of cancellation peak coefficients pre-stored in one of the plurality of peak cancellation units, wherein the plurality of cancellation peak coefficients are read out once every M time taps with a phase and a magnitude difference between a magnitude and a predetermined threshold of the peak.

18. The method according to claim 16, wherein N=M.

* * * * *